US008233670B2

(12) United States Patent
Moed et al.

(10) Patent No.: US 8,233,670 B2
(45) Date of Patent: Jul. 31, 2012

(54) SYSTEM AND METHOD FOR TRAFFIC SIGN RECOGNITION

(75) Inventors: Michael C. Moed, Hopkinton, MA (US); Thomas W. Bonnick, Greenville, RI (US)

(73) Assignee: Cognex Corporation, Natick, MA (US)

( * ) Notice: Subject to any disclaimer, the term of this patent is extended or adjusted under 35 U.S.C. 154(b) by 1249 days.

(21) Appl. No.: 11/967,966

(22) Filed: Dec. 31, 2007

(65) Prior Publication Data
US 2009/0074249 A1    Mar. 19, 2009

Related U.S. Application Data

(60) Provisional application No. 60/972,074, filed on Sep. 13, 2007.

(51) Int. Cl.
*G06K 9/00* (2006.01)
(52) U.S. Cl. ........ 382/113; 382/100; 382/103; 382/159; 382/181; 382/209; 382/224; 382/226; 382/254; 382/274
(58) Field of Classification Search .................. 382/100, 382/103, 113, 209, 181, 224, 159, 226, 254, 382/274
See application file for complete search history.

(56) References Cited

U.S. PATENT DOCUMENTS

| | | | |
|---|---|---|---|
| 5,633,944 | A | 5/1997 | Guibert et al. |
| 6,067,374 | A | 5/2000 | Fan et al. |
| 6,266,442 | B1 | 7/2001 | Laumeyer et al. |
| 6,363,161 | B2 | 3/2002 | Laumeyer et al. |
| 6,449,384 | B2 | 9/2002 | Laumeyer et al. |
| 6,453,056 | B2 | 9/2002 | Laumeyer et al. |
| 6,625,315 | B2 | 9/2003 | Laumeyer et al. |
| 6,674,878 | B2 * | 1/2004 | Retterath et al. ............. 382/104 |

(Continued)

FOREIGN PATENT DOCUMENTS

EP    1383098 A1    1/2004
(Continued)

OTHER PUBLICATIONS

Hsu et al, "Road Sign Detection and Recognition Using Matching Pursuit Method", Jan. 24, 2000, pp. 119-129, Publisher: Image Vision Computing, Published in: TW.

*Primary Examiner* — Brian Q Le
*Assistant Examiner* — Julian Brooks
(74) *Attorney, Agent, or Firm* — William A. Loginov

(57) ABSTRACT

This invention provides a vehicle-borne system and method for traffic sign recognition that provides greater accuracy and efficiency in the location and classification of various types of traffic signs by employing rotation and scale-invariant (RSI)-based geometric pattern-matching on candidate traffic signs acquired by a vehicle-mounted forward-looking camera and applying one or more discrimination processes to the recognized sign candidates from the pattern-matching process to increase or decrease the confidence of the recognition. These discrimination processes include discrimination based upon sign color versus model sign color arrangements, discrimination based upon the pose of the sign candidate versus vehicle location and/or changes in the pose between image frames, and/or discrimination of the sign candidate versus stored models of fascia characteristics. The sign candidates that pass with high confidence are classified based upon the associated model data and the drive/vehicle is informed of their presence. In an illustrative embodiment, a preprocess step converts a color image of the sign candidates into a grayscale image in which the contrast between sign colors is appropriate enhanced to assist the pattern-matching process.

22 Claims, 13 Drawing Sheets

U.S. PATENT DOCUMENTS

| | | |
|---|---|---|
| 6,801,638 B1 | 10/2004 | Janssen et al. |
| 6,813,545 B2 | 11/2004 | Stromme |
| 6,856,698 B1 | 2/2005 | Silver et al. |
| 6,891,960 B2 | 5/2005 | Retterath et al. |
| 7,016,539 B1 | 3/2006 | Silver et al. |
| 7,043,057 B2 | 5/2006 | Retterath et al. |
| 7,068,844 B1 | 6/2006 | Javidi et al. |
| 7,092,548 B2 | 8/2006 | Laumeyer et al. |
| 7,173,707 B2 | 2/2007 | Retterath et al. |
| 2004/0010352 A1* | 1/2004 | Stromme ............ 701/1 |
| 2004/0086153 A1 | 5/2004 | Tsai et al. |
| 2006/0034484 A1* | 2/2006 | Bahlmann et al. ............ 382/103 |
| 2007/0154067 A1* | 7/2007 | Laumeyer et al. ............ 382/103 |

FOREIGN PATENT DOCUMENTS

| | | |
|---|---|---|
| EP | 1909230 A1 | 4/2008 |
| WO | WO 2007004439 A1 | 1/2007 |

* cited by examiner

SYSTEM AND METHOD FOR TRAFFIC SIGN RECOGNITION

RELATED APPLICATIONS

This application claims the benefit of U.S. Provisional Application Ser. No. 60/972,074, filed Sep. 13, 2007, entitled TRAFFIC SIGN RECOGNITION, the entire disclosure of which is herein incorporated by reference.

FIELD OF THE INVENTION

This application relates to camera-based vision systems and pattern recognition using machine vision, and more particularly to systems for aiding in the navigation of vehicles using camera-based vision systems.

BACKGROUND OF THE INVENTION

The use of machine vision to guide vehicles and alert drivers of potential hazards has been a subject of research for many years. One area of particular interest in vehicle-based vision systems is the recognition of traffic signs. In certain jurisdictions, such as parts of Europe, traffic signs virtually litter the highways. However, certain signs—those indicating a hazard, stop and yield signs, speed limit signs and the like require the vehicle driver's immediate attention and compliance. Failure to comply could result in a violation of law, or even a traffic accident.

Where vehicles are used commercially, for example delivery and long-haul trucks, there is a great incentive to ensure driver safety. In addition, the number of features provided to high and middle-end automobiles keeps growing. In both instances, the ability to recognize signs and their underlying information is highly desirable. This information can be used to warn the human driver of an oncoming change, or in more-intelligent vehicle systems, to actually control the speed and/or steering of the vehicle.

However, the successful recognition of road signs is not a trivial problem to solve. As noted below, road signs often share geometric properties with surrounding structures in their environment such as building roof lines, vehicle outlines and the like. Many signs have roughly similar outline shapes and they may have similar color schemes. Likewise some signs utilize colors that do not show contrast well for a machine vision system—particularly where a non-color image sensor is employed or the image is processed in grayscale. Moreover, changes in background color due to the surrounding environment, clouds and the like may affect the degree to which a sign contrasts with its surroundings. These factors all affect the reliability of a machine-vision-based sign-recognition system. In addition, many currently proposed sign recognition systems are based around a template-style matching algorithm. However, template systems have a disadvantage in that many viewed orientations do not match up well with the stored template values. Other times, the surroundings or environmental conditions (rain, fog, etc.) may significantly alter the perceived shape of the sign, making a template system significantly less reliable as a predictor of the type of traffic sign.

However, it is recognized that many traffic signs, particularly those designed to International Road Sign standards use fairly distinctive outline shapes, color combinations and internal fascia designs. Using these attributes, among others, it is desirable to provide a vehicle-mounted traffic sign recognition system that can quickly and reliably detect the correct type of road sign in a variety of positions from a variety of viewing angles.

SUMMARY OF THE INVENTION

This invention overcomes the disadvantages of the prior art by providing a vehicle-borne system and method for traffic sign recognition that provides greater accuracy and efficiency in the location and classification of various types of traffic signs by employing rotation and scale-invariant (RSI)-based geometric pattern-matching on candidate traffic signs acquired by a vehicle-mounted forward-looking camera and applying one or more discrimination processes to the recognized sign candidates from the pattern-matching process to increase or decrease the confidence of the recognition. These discrimination processes include discrimination based upon sign color versus model sign color arrangements, discrimination based upon the pose of the sign candidate versus vehicle location and/or changes in the pose between image frames, and/or discrimination of the sign candidate versus stored models of fascia characteristics.

In an illustrative embodiment, one or more camera sensors, that can be mounted on a windshield interior view the oncoming environment and are adjusted to view traffic signs at a predetermined range and position. The sensor assembly is operatively connected to a vision processor that stores trained model image data relating to various traffic signs along with type/classification data (and subtype where appropriate) for the respective sign models. Sign candidates are initially acquired in a color image that by the camera sensor. An optional preprocess step then converts the color image frame into an intensity grayscale image. Certain ranges (hues) in the color image are intensity-enhanced in the grayscale counterpart, as well as detected combinations of confusable colors, to improve the chances of accurate geometric pattern-matching. The processor then performs the RSI pattern-matching process on the enhanced grayscale intensity image from the preprocess step, comparing the imaged candidate signs to appropriate trained models of exterior (and where applicable interior) geometric features, the models being transformed to match the orientation of the candidates. Alternatively, preprocessing is omitted and RSI pattern-matching is performed on a color image. Sign candidates that are recognized by the pattern-matching process are typed or classified, and applicable pose and confidence data from the pattern-matching process is provided to the discriminator processes, along with color pixel data where appropriate so that the sign candidates can be further analyzed variously in the color (and grayscale) domain, and respective confidence in the recognition of the candidates can be raised or lowered. Those sign candidates with high confidence are classified based upon the model data and the driver and/or vehicle is alerted to the presence of the sign. In addition certain discriminators, such as a fascia discriminator and/or character recognition can allow determination of a sign subtype by comparing a candidate's internal fascia features to model features.

BRIEF DESCRIPTION OF THE DRAWINGS

The invention description below refers to the accompanying drawings, of which.

DETAILED DESCRIPTION

Figure 1:
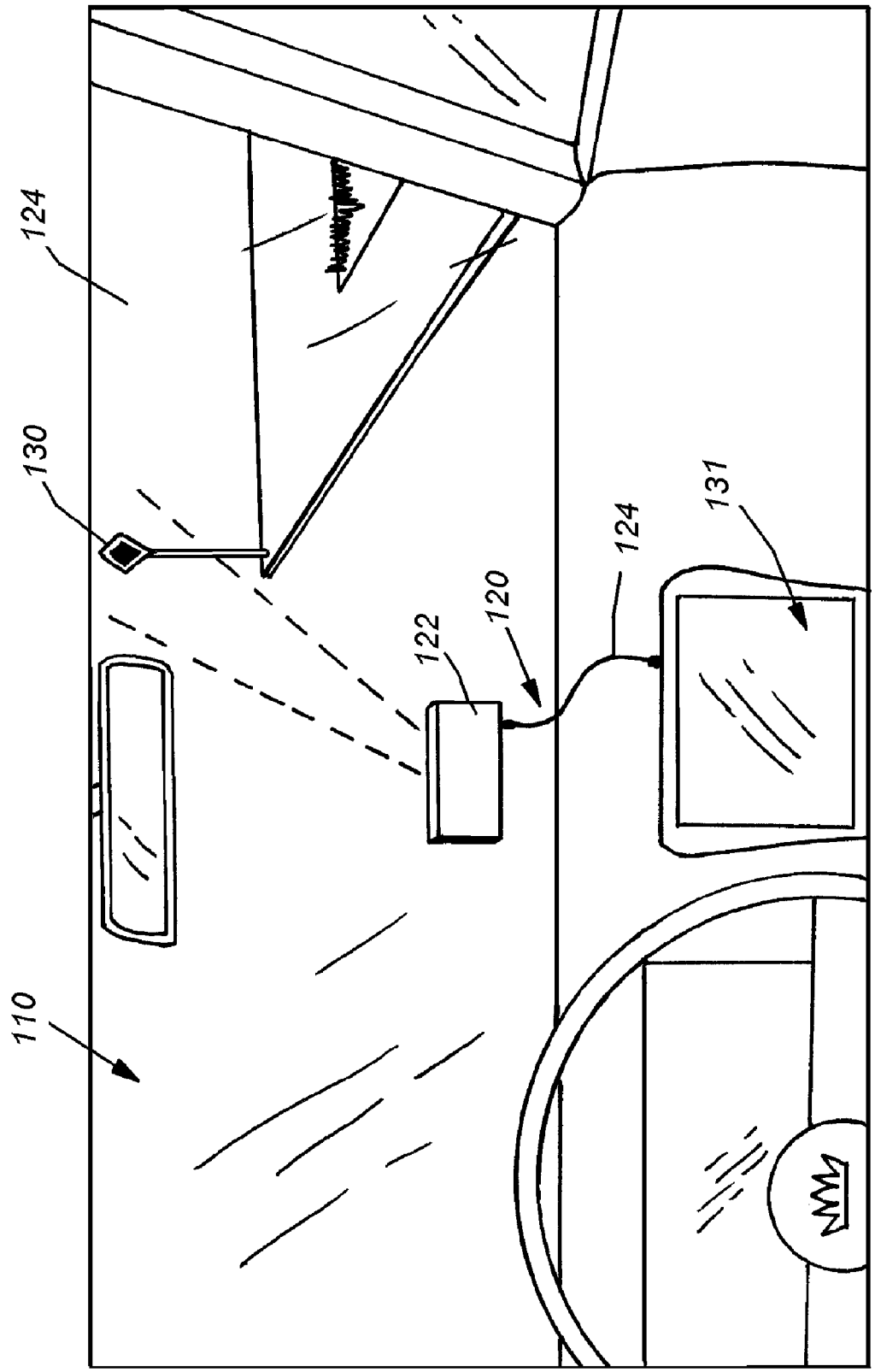
FIG. 1 is a perspective view of a vehicle interior having a traffic sign recognition system according to an illustrative embodiment shown viewing an oncoming traffic sign.

FIG. 1 shows the interior compartment 110 of a typical vehicle equipped with a traffic sign recognition system 120 according to an illustrative embodiment of this invention. The system in this embodiment consists of a vision sensor assembly 122 that can comprise a housing 122 mounted on the vehicle windshield 124 at an appropriate location and an enclosed camera or other imaging sensor that is generally forward-looking and includes a field of view (FOV) directed so as to image oncoming traffic signs 130 at an appropriate range. In one embodiment, the enclosure can be adjustable to provide the desired direction to the field of view, which is assured to image signs that appear at a predetermined range and at a predetermined location. For example, the sensor can be adjusted to fully image signs within 100 meters. The FOV can be established to view signs on both sides of a road at the predetermined distance from the front of the vehicle. This would assure ample warning of the sign's content before passing it. The camera and or enclosure 122 can also house a preprogrammed vision processor (described further below), which converts either discrete images or a data stream into sign recognition data using techniques to be described. The enclosure can include a display and/or visual/audible alert system, or such an alert and/or display system (and the processor) can be a separate console 131 connected via a cable 124. This cable can also deliver power to the camera. Where all alert components are located within the enclosure, the cable is used mainly for power, and optionally for transmission of information that can be used in a system to provide emergency control inputs for use in a collision avoidance system or autonomous vehicle control system, that automatically applies braking, steering, collision avoidance maneuvers, etc.). Input/output I/O interconnects for connecting calibration, training/programming and diagnostic devices can also be provided.

Figure 2:
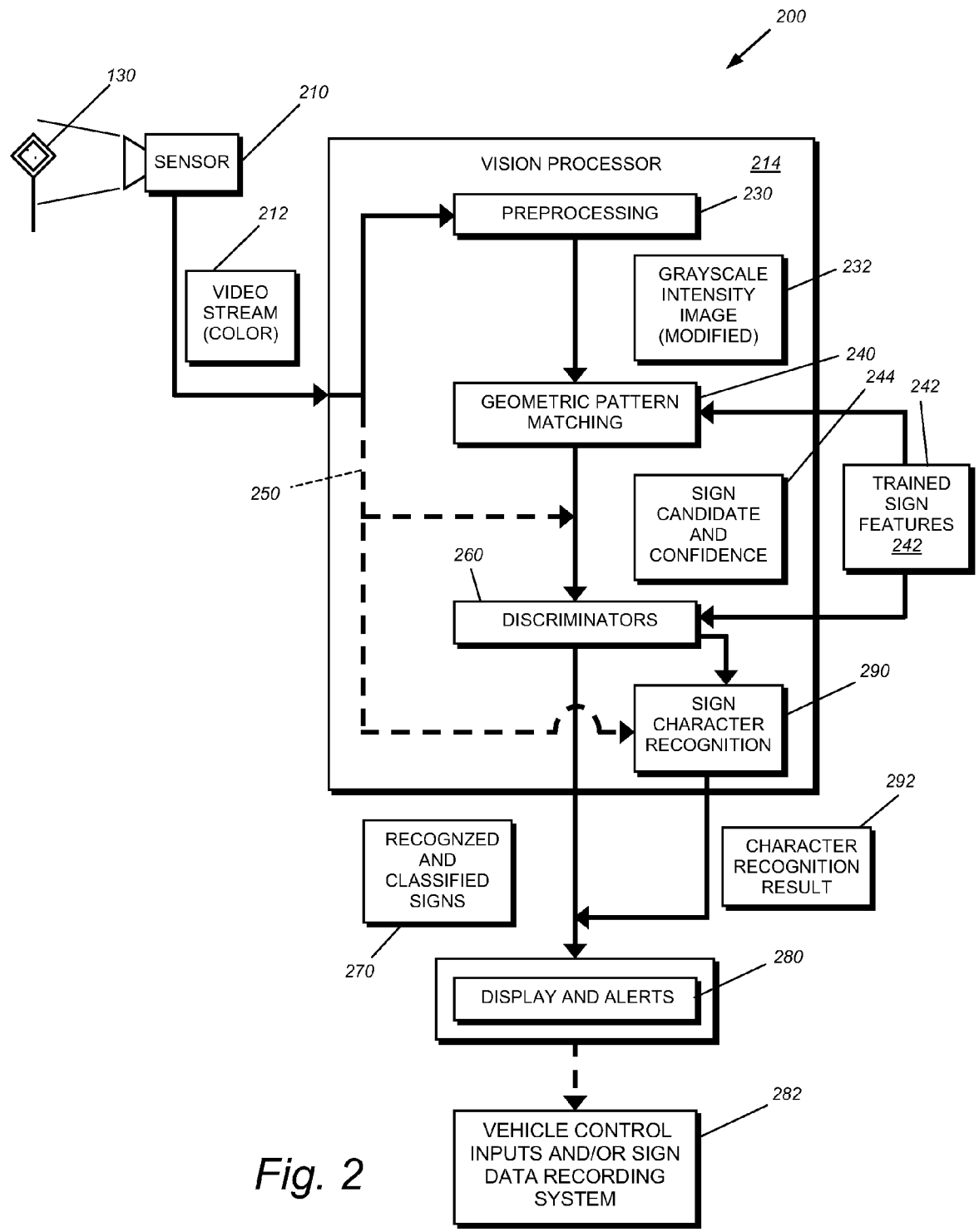
FIG. 2 is a schematic block diagram of the traffic sign recognition system according to the illustrative embodiment.

With further reference to FIG. 2, the basic components of the system 120 are now described in further detail. The image sensor 210 images a passing traffic sign and delivers a stream of images 212 to the vision processor. The sensor can be any acceptable image acquisition device such as a CCD or CMOS camera with an appropriate lens/optics assembly. As noted, the processor 214 can be any acceptable processing device including a microprocessor or specialized processing circuit. The processor 214 may be part of the sensor package or can be a separate unit, operatively connected to the sensor. The video images 212 received by the processor are typically Bayer color images, but can be grayscale (monochrome) images, or other forms of color imagery in alternate embodiments. The acquisition of color images is advantageous in that it allows the use of certain discriminators which aid in increasing the likelihood (raising the confidence) of correct sign recognition.

The video image stream is typically broken into discrete frames using a frame grabber (not shown) or other similar device that can be incorporated with the sensor 210. In an illustrative embodiment, the frames are the passed to a preprocessor 230 that converts the color image into an enhanced intensity grayscale image 232 according to a procedure described further below. Note that in alternate embodiments, the preprocess step can be omitted. In one embodiment, the entire FOV of the image is enhanced. In alternate embodiments the enhancement may be limited to regions (elevations, for example) of the image in which signs will typically appear. The enhanced grayscale intensity image 232 (or, alternatively, a color image without grayscale preprocessing) is then provided to a geometric pattern-matching process 240. This process is based upon the recognition of an imaged sign's geometric features—of which recognizable outline shapes are one such set of features and contrasting interior shape designs are another set of features—using pre-trained images 242. These pre-trained images can be based upon acquisition of actual sign images at a predetermined range and position from which the RSI geometric pattern-matching process can compare the transformed sign images acquired during runtime operation. Given a good training example of a sign, the process can determine the rotation, scale and skew (pose) of an acquired sign image of similar type. Alternatively some or all of the sign's geometric features can be trained using synthetically generated features using, for example, a geometric rendering tool, such as a drawing of the sign or a CAD-generated sign image. Notably, the geometric Pattern-matching process employs rotation and scale-invariant (RSI) search techniques found in robust vision systems such as PatMax™ and PatQuick™ (both available from Cognex Corporation of Natick, Mass.), or another RSI-based tool that is designed for shape matching. A further description of these systems is provided, respectively, in commonly assigned U.S. Pat. No. 6,856,698, entitled FAST HIGH-ACCURACY MULTI-DIMENSIONAL PATTERN LOCALIZATION, by Silver, et al., and U.S. Pat. No. 7,016,539, entitled METHOD FOR FAST, ROBUST, MULTI-DIMENSIONAL PATTERN RECOGNITION, by Silver, et al., the teachings of both patents being expressly incorporated herein by reference. The pattern-matching (also termed a "shape-finder") process generally includes a range data pre-set mechanism to receive allowable ranges, scale, skew and rotation with which sign candidates are matched against the pre-trained sign data. The use of RSI tools is desirable, as certain types of signs tend to have fairly specific geometric features. For example, in most jurisdictions "YIELD" signs tend to be triangular, "STOP" signs tend to be octagonal, while other signs may be rectangular, diamond-shaped or circular. Likewise, many signs, especially in European jurisdictions have distinct, differently colored printed shapes within external boundary shapes, such as smaller diamonds within large diamond-shaped signs (certain caution signs), and red circles within larger white circular signs (speed signs). Since they will be viewed by the system 120 at a variety of angles, elevations and distances, a matching process that can quickly resolve the rotation, skew and scale of a subject in an image is a significant benefit.

The geometric Pattern-matching process 240 produces sign candidates 244 from the comparison with trained sign features 242. Pose data for the produced candidates is also produced. Such pose data can include position, scale, skew and rotation in the image, relative to the trained model. These produced sign candidates will have a certain confidence value appended to them. Confidence can be derived as a function of certain commercially available RSI processes.

To eliminate false recognition (false positives), the system 120 delivers both the grayscale intensity image 232 (when such intensity images are used by the RSI pattern-matching process) and color image frames (dashed line 250) to a set of discriminator processes 260. These discriminator processes 260 are described in detail below. Briefly, they review the traffic sign candidate(s) received from the pattern-matching process 240, and employ other techniques to derive confidence values for each candidate. The recognized sign (or signs) 270 (if any) is/are forwarded to the alerting process, which can include a display 280 of the image or other relevant data as well as audible alerts associated with the particular recognized sign (for example, audibly informing the driver of an approaching STOP sign). The various discrimination processes employed operate in succession on each of the candidates. That is, where more than one type of discrimination is employed on a candidate, the various discriminators analyze that candidate in succession, with the confidence level of the recognition of the candidate being modified upwardly or downwardly based upon the results of each discriminators analysis. Confidence levels that fall below a given threshold at some point along the processing path cause elimination of the associated candidate. Note that "candidates" can be different acquired objects to which a given pre-trained sign feature model has been associated, or different models associated with the same model, where there is some similarity between the candidate and more than one model in the training database. For example, a diamond-shaped sign may initially match with a number of trained diamond signs. Several potential models may be associated with it as candidates, the discriminators then used other techniques (color, pose, fascia, for example) in an attempt to derive the correct association.

Optionally, the system 120 can deliver traffic sign information to be combined with other telemetry and sensor inputs (vehicle speed, steering, location and lane information, for example), and/or to a recording and data-storage system that can be used to track the vehicle's progress, for debugging and analysis of the system or other useful tasks 282. Where data is recorded, images and/or data related to passed sign candidates, failed sign candidates, or both, can be stored. As a further option, the color and/or grayscale image data can be provided to a character recognition process 280 with the capability to read words, symbols and/or numbers so that alphanumeric signage instructions, speed information or other cartouches (children-crossing images for example). The information from the center of a sign is extracted from the image or via one or more discriminators (described below), and either read using, for example optical character recognition (OCR) processes or other Pattern-matching systems that are based on trained patterns. This recognition result 292 can also be provided to the display/alert device 280.

Figure 3:
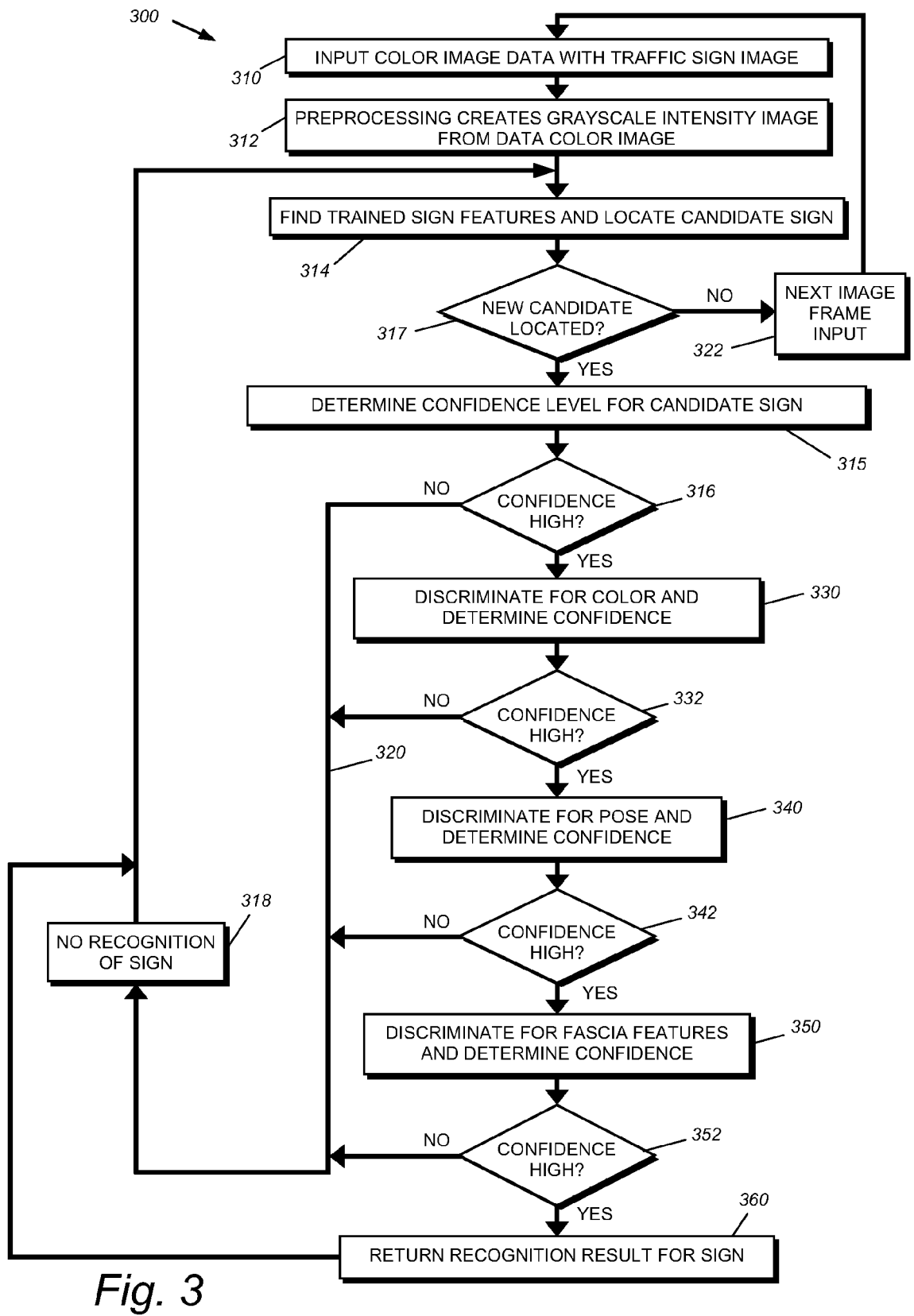
FIG. 3 is a flow diagram of the traffic sign recognition procedure for use with the system described in FIG. 2.

With further reference to FIG. 3 the traffic sign recognition procedure 300 is now described in further detail. An image frame is input to the processor in step 310. The frame may be full-resolution, or may be boxed so that only data within the part of the field of view (FOV) where a traffic sign is likely to be found is provided. The location and size of the box of the FOV can be programmed at system setup, obtained through calibration (whereby the image sensor is calibrated with respect to location/pose in the vehicle), or learned by repeated recognition of signs and averaging of the approximate locations within the FOV where the plurality of signs are recognized.

Figure 4:
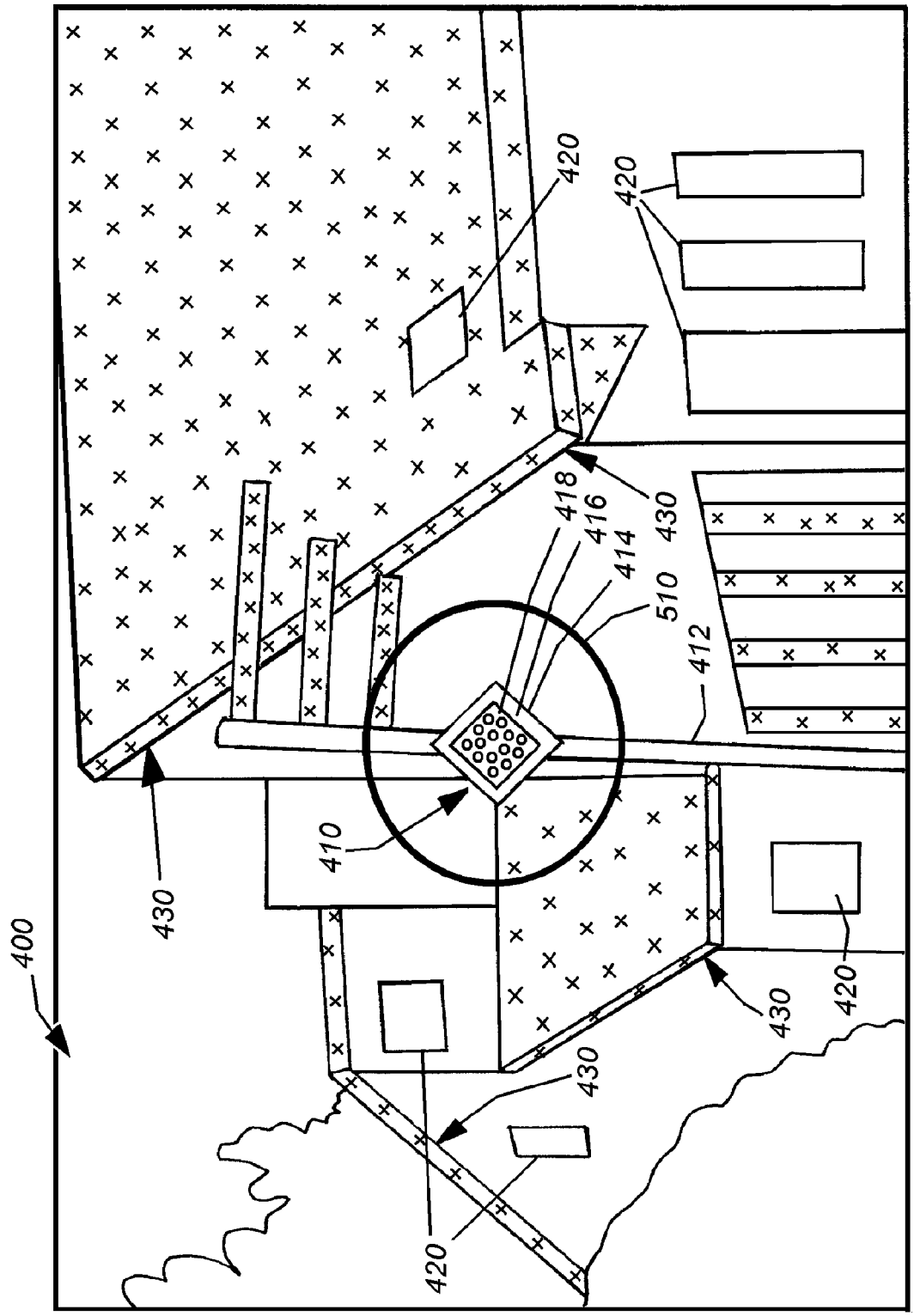
FIG. 4 is a diagram of an exemplary Bayer color image transmitted from the system camera including a candidate sign for recognition.
Figure 5:
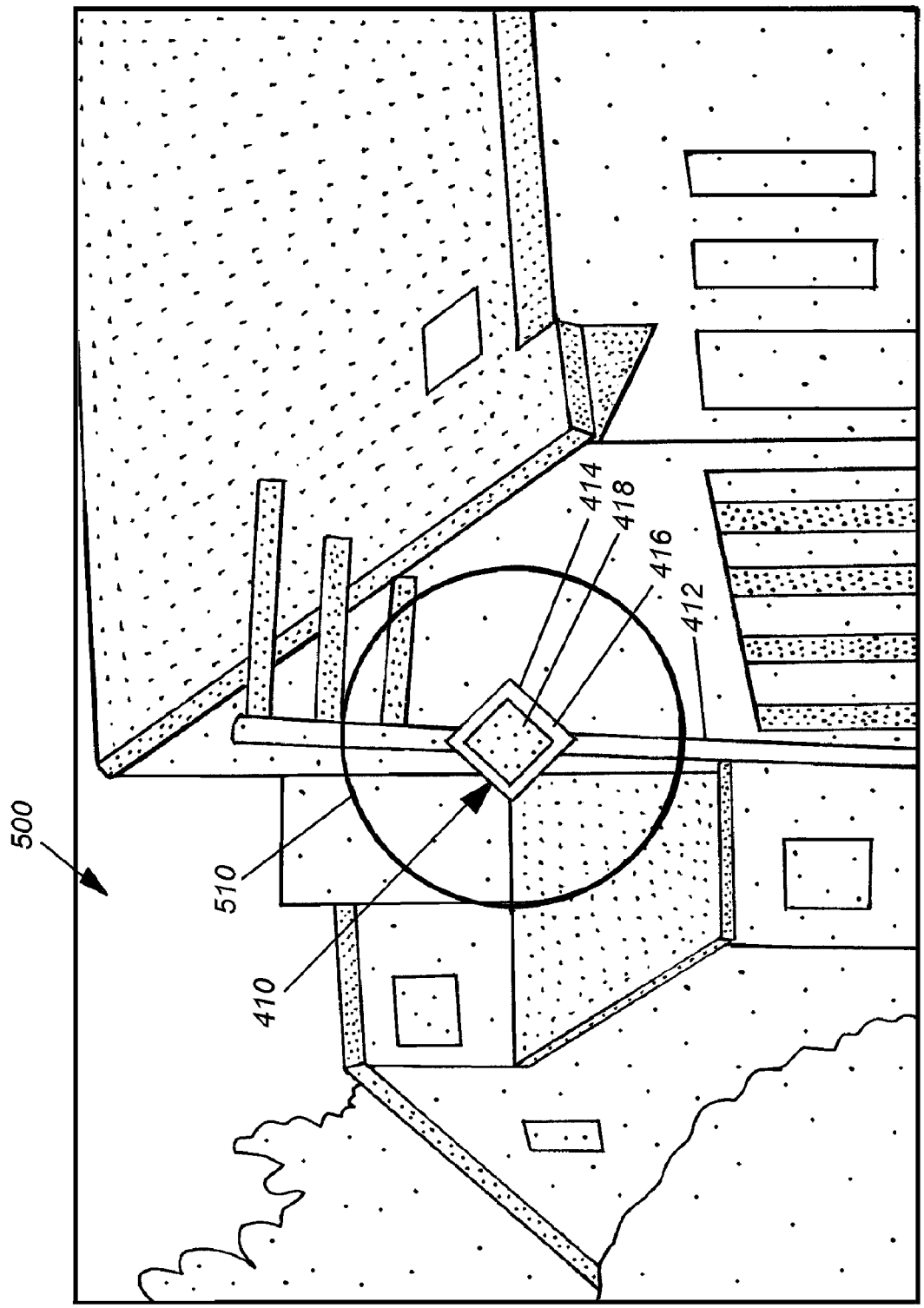
FIG. 5 is a diagram of an exemplary grayscale intensity image converted from the color image of FIG. 4 and illustrating low-contrast between sign features having confusable color combinations.

With further reference to the procedure 300, once the color image is input, it is optionally preprocessed to create a grayscale intensity image (step 312). The preprocessing subprocedure and benefits of preprocessing are further described with reference to the image views of FIGS. 4, 5 and 6. In general, the use of a grayscale image requires less computation and, thus affords enhanced operating speed to RSI processes, which can be highly desirable when attempting to resolve a number of fast-passing signs. A monochrome representation of a Bayer color image 400 is shown in FIG. 4, wherein the various key colors are represented as differing types of shading. In this example, the subject sign 410 on the signpost 412 defines a diamond-shaped outline 414 with a white outer border 416 of a given width and a yellow diamond center 418.

With reference to the image 400 in FIG. 4, it should be noted generally that a large number of other background objects within this common image also have the general appearance of a directly viewed or skewed diamond-shaped sign. For example, the windows and skylights 420 and roof lines 430 may all be incorrectly interpreted as a diamond-shaped (or other shape) sign. The use of additional discriminators according to the illustrative embodiments herein, along with a robust RSI shape-finding/pattern-matching process, greatly reduces the risk of misidentifying these objects 420, 430 as signs.

However, the conversion of the exemplary Bayer (or other color imagery format) color image 400 to a grayscale image may make it difficult to resolve the sign's features during pattern-matching or other discrimination steps. In this example, a representation of the direct conversion of the color image 400 to a grayscale image 500 converted image 500. Since this conversion translates intensity values for the color image into grayscale intensities, the yellow center 418, which has a similar intensity to the sign's white border 416, nearly disappears and generally washes together with the border 416. This closeness in grayscale intensities renders geometric pattern-matching based upon these two features (for example, a faded yellow diamond within white background) much more challenging.

To assist the effectiveness of the pattern-matching process, the preprocess step attempts to enhance all or part of the image so as to increase/enhance the relative contrast between adjacent grayscale features. This aids the geometric pattern-matching process in identifying features as potential sign candidates based upon trained sign features.

Figure 6:
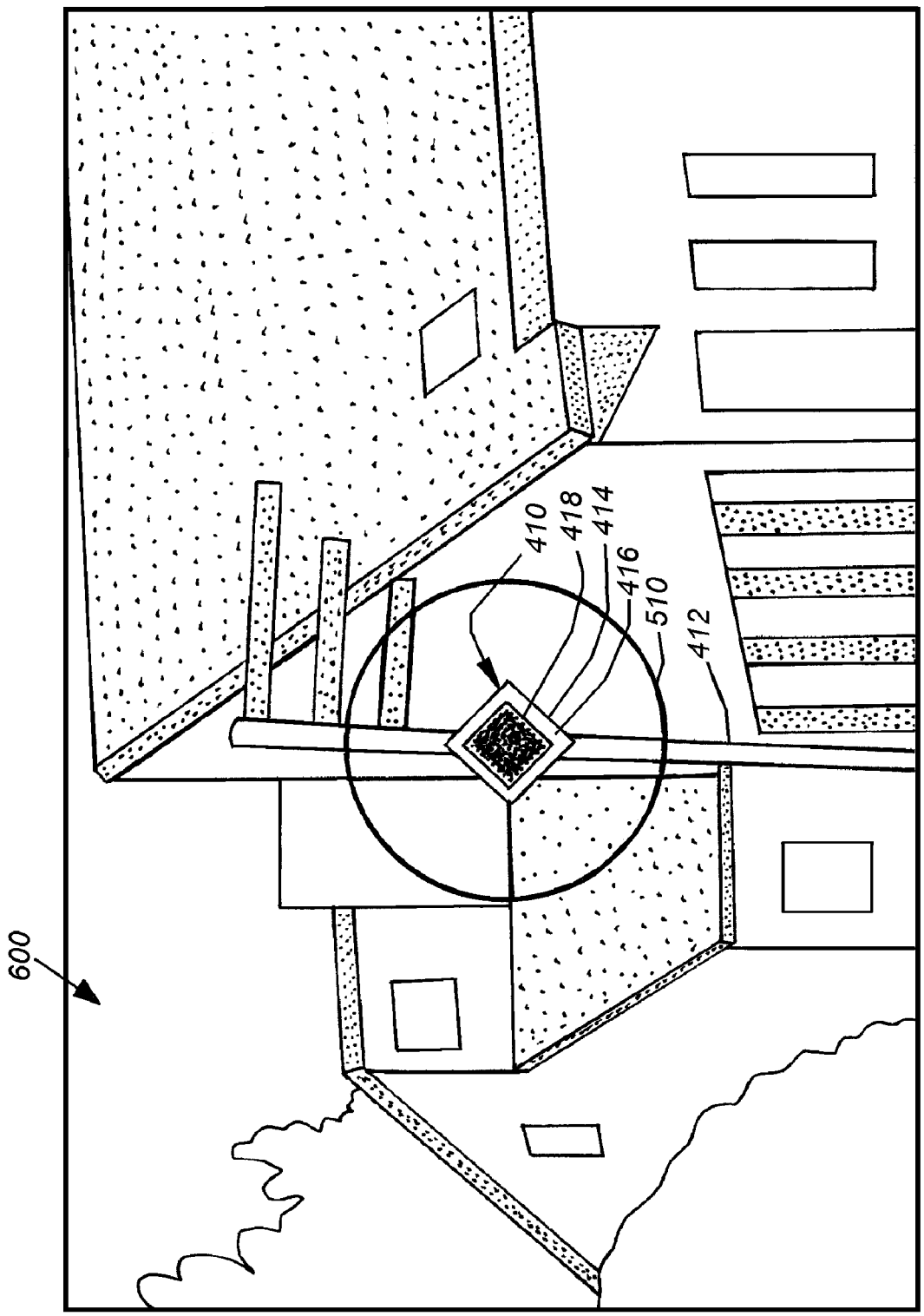
FIG. 6 is a diagram of an exemplary grayscale intensity image in accordance with FIG. 5 in which the inner feature of the sign has been darkened by the system to improve contrast between sign features prior to recognition.

As shown in FIG. 6, the enhanced-intensity grayscale image 600, where the image pixels constituting the sign center 418 are changed in intensity to increase the contrast with the surrounding white border 416. Alternatively, the border intensity can be changed, or both features' (center and border) intensities can be changed—all with the goal of enhancing the relative contrast therebetween. This change in contrast between two confusable colors can be based on stored data of known confusable color combinations. The system's trained sign database can contain pixel correction factors to be employed when a given color combination is identified in a region of interest. Alternatively, for certain identified sign colors or ranges (hues) that are known to be problematic, such as yellow can be enhanced automatically to a different intensity without particular reference to a database of confusable color combinations. Again referring to the procedure 300 of FIG. 3, after the optional enhanced grayscale intensity image of the sign 410 is generated, the image data in this region is passed to the RSI geometric pattern-matching process (step 314). The process is then run on the modified intensity image 600 with specified models, scale-range, and rotation-range, and skew-range to locate each trained sign feature candidate. The exemplary sign 410 is one such candidate having exterior and interior diamonds that correspond to trained features available to the process. Thus in a geometric patent-matching process, the sign 410 is expected to be returned as a candidate. As described above, the geometric pattern-matching process of this embodiment can be based upon a commercially available RSI process. Thus, signs that appear in a region of interest with differing scales and rotations can be matched based upon the database of trained patterns and the ability of the process to transform these parameters. More particularly, the geometric pattern-matching process is characterized as being pre-trained with desired traffic sign features, including the external sign shape and, if applicable, and internal sign shapes as well, and the process is pre-set with allowable ranges of shape, scale, skew and rotation. Note that the RSI geometric pattern-matching process has particular advantages in pre-training of model features. In particular, unlike vision systems based on a model-based correlation search, which require multiple training images for each sign type at various orientations (i.e. multiple models at differing scales, rotations, skews), the RSI process is sufficiently robust to allow recognition of an acquired image at a variety of orientations using a single good, actual or synthetic trained model.

In the illustrative embodiment, the RSI pattern-matching models contain exterior and interior geometric features (for example, the diamond-within-diamond) where the associated sign types also contain such interior and exterior features. Where a sign contains no internal geometric features (or, alternatively, such internal features represent a subtype of sign having internal characters or a fascia), the trained model and the geometric pattern-matching are based upon the exterior features.

Also, while the preprocess step provides a grayscale image, the geometric pattern-matching process can typically use either intensity image and/or color imagery to find shapes, and in alternate embodiments, such color images can be employed. For example, the process can use a red color plane to locate red signs. In various embodiments, the use of grayscale intensity versus color imagery may be selected at runtime based on color content in the imagery. Likewise, when glare or shadow conditions are encountered, the image color content may be limited.

Figure 7:
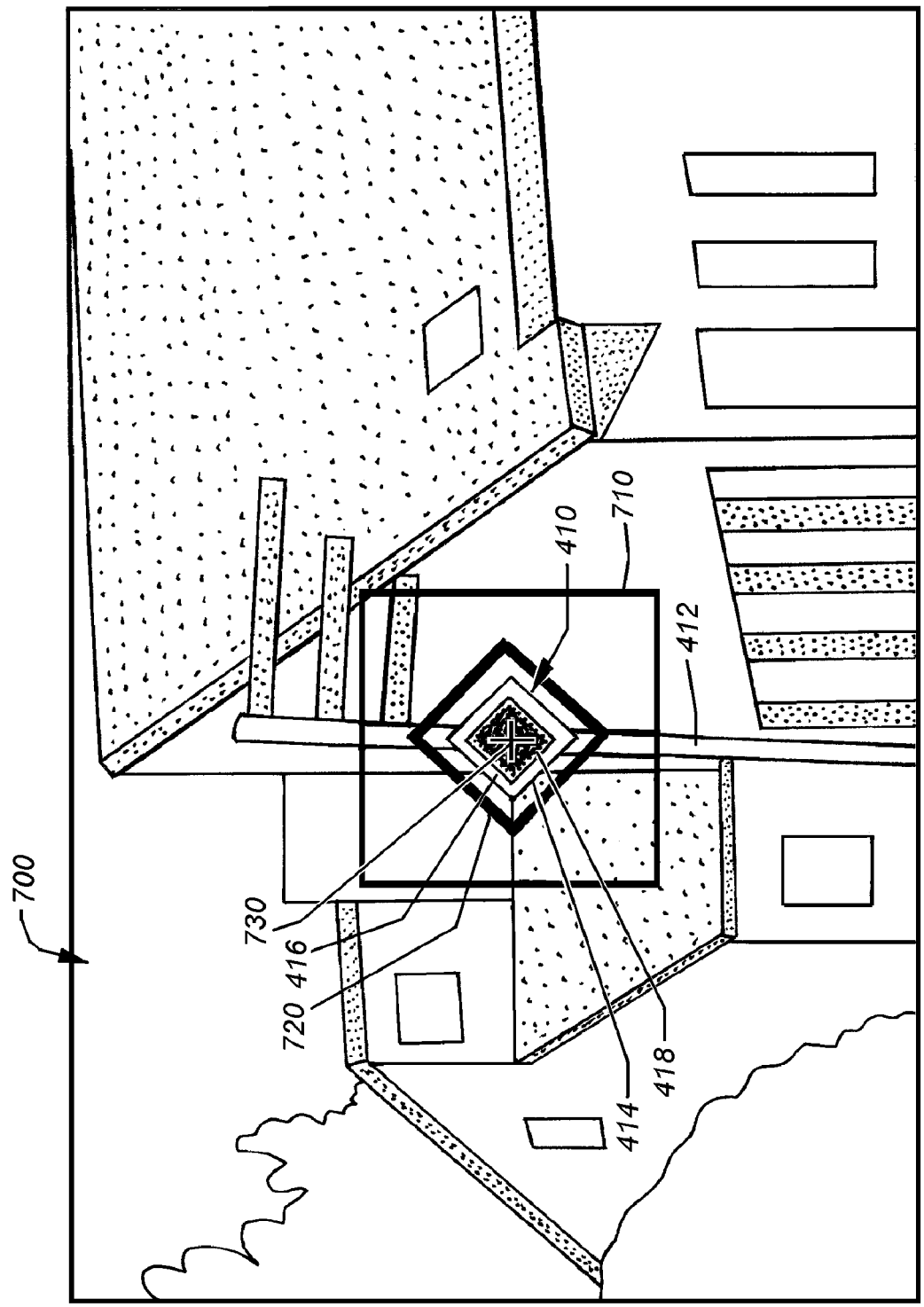
FIG. 7 is a diagram of the exemplary enhanced grayscale intensity image of FIG. 6 in which the candidate sign is undergoing a geometric pattern-matching process.

Referring now to the enhanced grayscale intensity image 700 of FIG. 7, which is provided from the preprocess image 600 (FIG. 6), the geometric pattern-matching process (step 314) has defined a region of interest 710 around the candidate sign 410. The RSI process has successfully transformed the sign image relative to an identifiable stored sign model, as represented by the surrounding diamond shape—which is centered (crosshair 730) about the recognized, enhanced-contrast diamond center 418. The process thus returns this sign as a candidate to match at least one stored model. It may be matched to a plurality of stored model features where, for example, signs have differing colors but similar shapes. Also returned is the candidate sign's pose (position, scale, rotation, etc.) in the image, and optionally, an initial confidence level for the match.

In an illustrative embodiment, the procedure step 314, thus, attempts to find each sign candidate, in turn, using the geometric pattern-matching process from the enhanced grayscale image. If no candidate is found (or no further candidates are found), then decision step 317 branches to step 322 and the image frame is input to initial step 310. If a new candidate is, in fact, located, then the decision step 317 branches to step 315, in which the confidence level (or another metric of successful recognition for that candidate) is determined. If the confidence level of the candidate is not sufficiently high (for example, less than 50%), then the decision step 300 branches to step 318 via branch 320 and the candidate is discarded. The procedure 300 then loops back to search for the next candidate in step 314. This loop continues until all candidates in a current image frame are either recognized (described further below) or discarded. When no candidates remain, the next frame is input to step 310 via steps 317, 322. Conversely, where a candidate is sufficiently recognized, the decision step 316 branches to the first discrimination step (330) to further refine the confidence level applied to recognition of the sign. The order in which the discrimination processes are undertaken can be varied and the order presented in the procedure 300 is only exemplary. Likewise, each discrimination process is, itself, optional in the overall procedure, and some discrimination processes can be omitted. It is contemplated that in an illustrative embodiment the procedure 300 will typically employ at least one of the discrimination processes to be described below. Other types of discrimination processes that refine the recognition confidence level for each candidate that results from geometric pattern-matching can be substituted for those presented. Thus, as used herein the basic term "discrimination" or "discriminator" can refer to any additional image processing step that uses image features from candidates received from the geometric pattern-matching process to refine the recognition confidence level.

Figure 8:
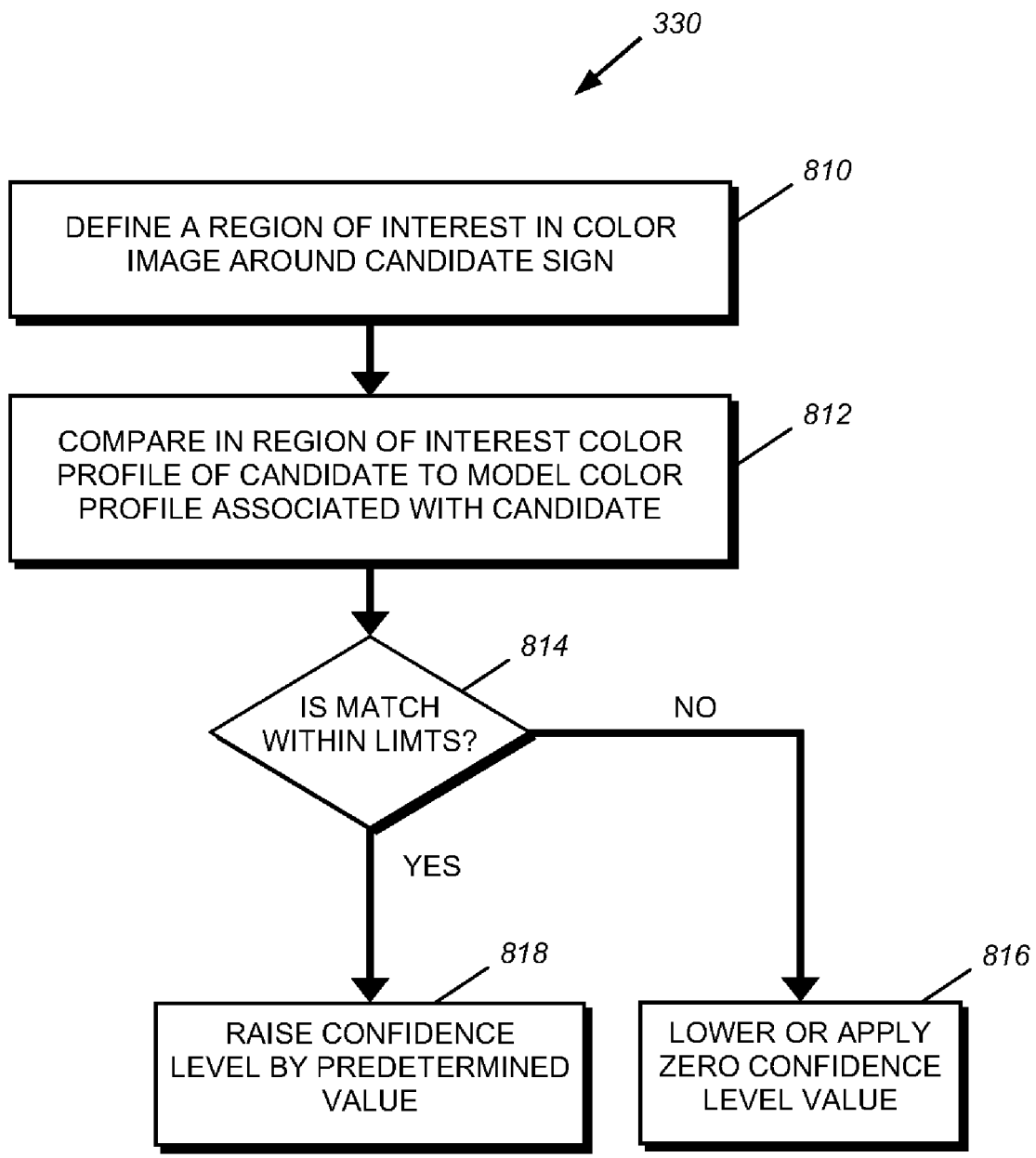
FIG. 8 is a flow diagram of a color discrimination process that is part of the traffic sign recognition procedure of FIG. 3 and that can be optionally employed in conjunction with the geometric pattern-matching process of FIG. 7.

In the example of FIG. 3, the decision step 316 directs recognized candidates to the color discrimination process (step 330). The color discrimination process 330 is further described with reference to FIG. 8. In this embodiment, the color discrimination process 330, in step 810, acts upon the candidate's region of interest (or another bounded area on the image containing the candidate) in the color version (image 400 in FIG. 4) of the image (Bayer, or another format of color imagery), as a color version of the candidate is used for this process step. In general, the color discrimination process 330 removes traffic sign candidates, or lowers the confidence level of traffic sign candidates whose color profile does not match a predetermined model. The color discriminator maintains a geometric model of each sign and the color profile of each closed geometric shape that constitutes the sign. In certain embodiments, where the image was not captured with a color camera, the color discriminator can be statically omitted. Where the scene is captured with a color camera, the color discriminator can measure the overall color content in the scene, or in the local area around the traffic sign candidate, and be dynamically omitted if the color content is not sufficient for accurate discrimination. When the color discriminator is employed, the color profiles of each projected closed geometric shape for the traffic sign candidate is ascertained through mapping of the candidate's pose, as received from the pattern matching process 314. The candidate's color profile is, thus, compared to the model's color profile (step 812).

Various techniques for comparing color in the color discrimination process 330 can be used, including histogram peaks, fuzzy classification, or other color-matching technique. If the candidate's color profile is not sufficiently close to the model color profile, the candidate is removed or its confidence is reduced (decision step 814 and step 818). For example, YIELD signs have a predominately red border. If a traffic sign candidate has a similar shape as a YIELD sign but does not have a sufficiently red border, the process can either eliminate it from the candidate list (set level to zero-confidence), or lower its confidence level. Candidates with sufficiently low confidence threshold (under 50 percent, for example) are discarded by the decision step 332 (branching to steps 318 and 322 for the next input), while candidates with sufficiently high confidence level (decision step 814 and step 818) are discriminated for pose in step 340.

Note that the term "confidence" should be taken broadly to include any metric that allows the system to differentiate between a reliable recognition and an unreliable recognition of a candidate sign. In one example a scale of 10 or 100 can be used to derive confidence levels/values. These scales can be weighted based upon the inherent robustness of the particular recognition procedure and where it fits in the overall flow of the recognition process. For example, a good match with the pattern-matching procedure can result in a high confidence score, while pose discrimination (step 340 below) may add a smaller percentage (up or down) to the overall confidence level.

Figure 9:
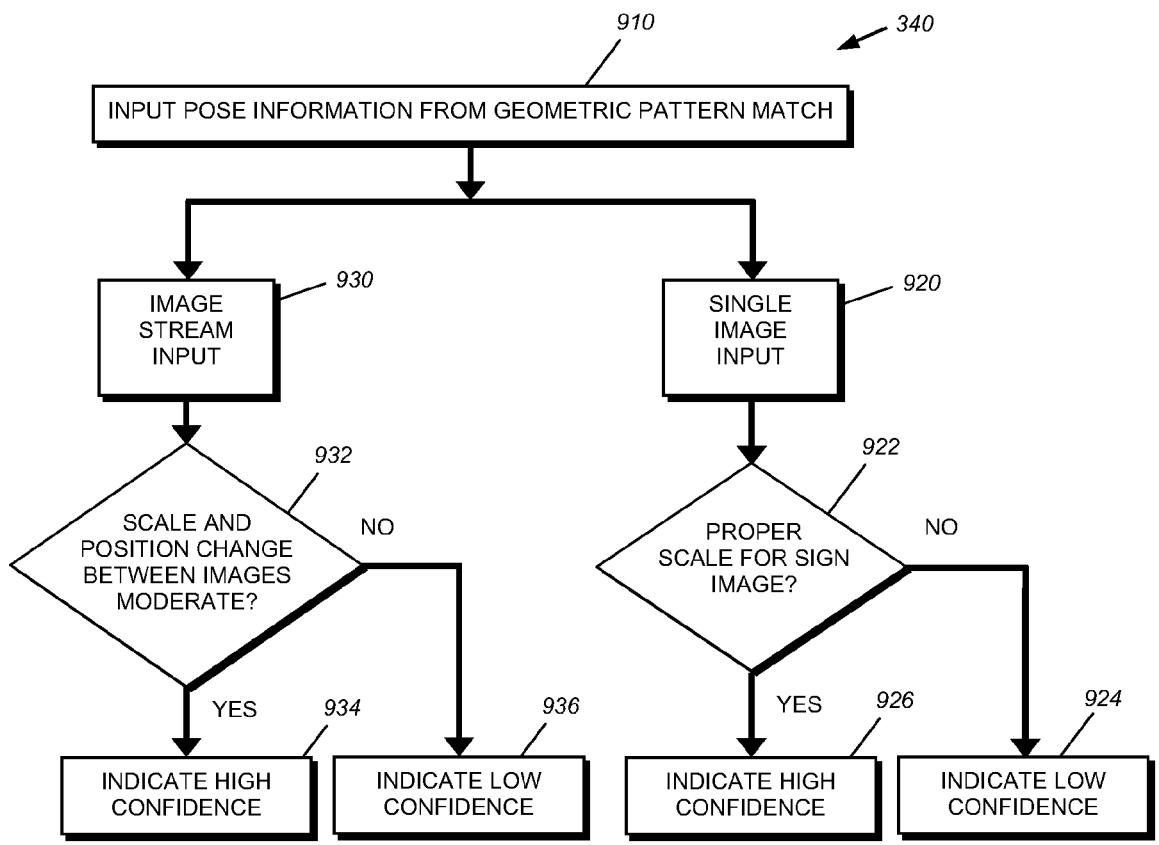
FIG. 9 is a flow diagram of a pose discrimination process that is part of the traffic sign recognition procedure of FIG. 3 and that can be optionally employed in conjunction with the geometric pattern-matching process of FIG. 7.
Figure 10:
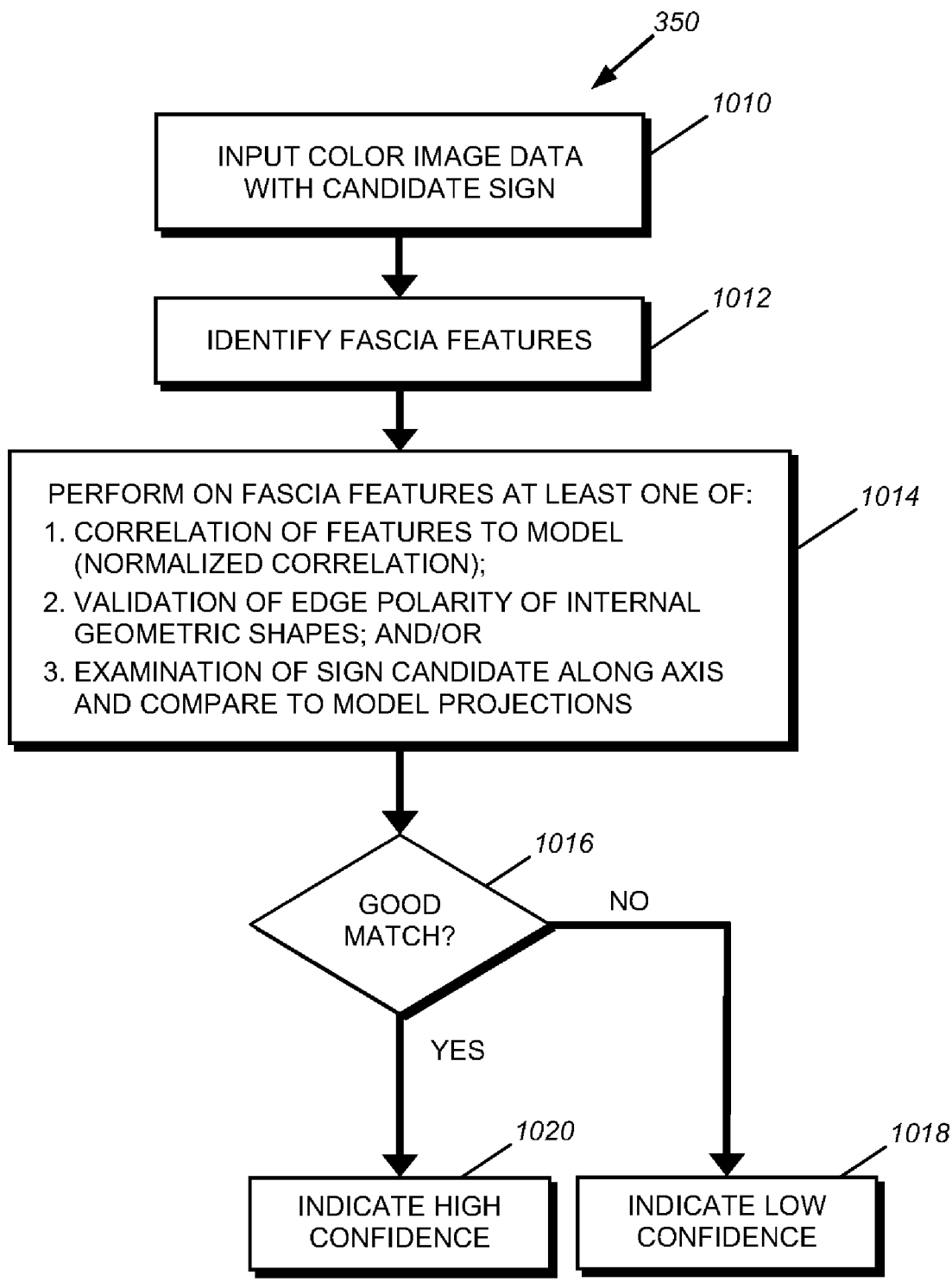
FIG. 10 is a flow diagram of a fascia discrimination process that is part of the traffic sign recognition procedure of FIG. 3 and that can be optionally employed in conjunction with the geometric pattern-matching process of FIG. 7
Figure 14:
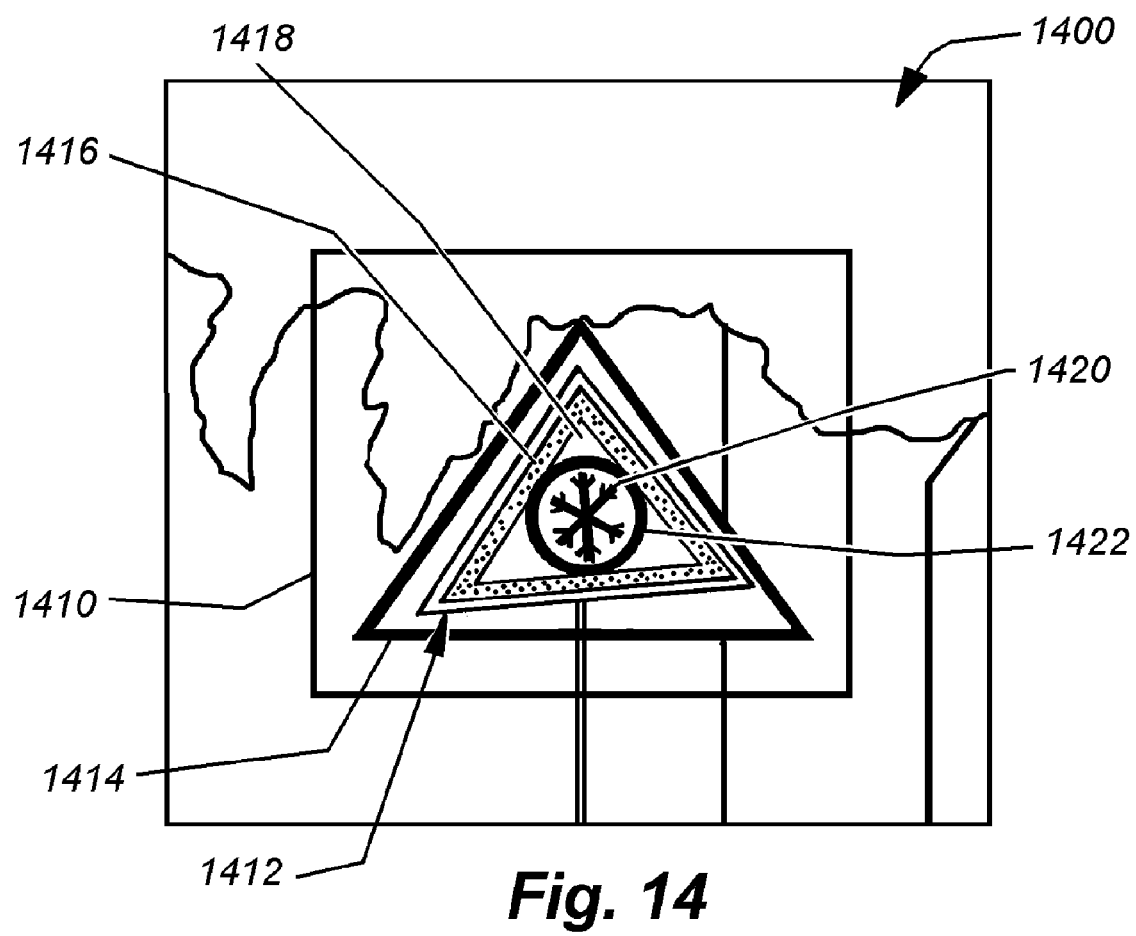

The pose discrimination process 340 is further described with reference to FIG. 9. The pose information from the geometric pattern matching process 314 is input to the pose discriminator (step 910). The pose discrimination process removes or alters the confidence of traffic sign candidates whose pose (scale, orientation) is inconsistent with its location in the image, or its location relative to similar signs found in previous images. After the information is input, the subsequent steps of the pose discrimination process 340 can differ depending upon whether a single image frame or a stream of frames is discriminated. In a single image frame input (step 920), if a vehicle is close to a traffic sign, it should appear larger than if the car is far away. Traffic sign candidates with small scale should not be considered (decision step 922) in certain image locations. Thus a lowered (or zero) confidence level is returned for such candidates (step 924). Similarly, traffic sign candidates with large scale should not be considered in certain image locations. These candidates would be eliminated or have their confidence reduced (step 924). Traffic sign candidates with appropriate scale, would conversely be considered good candidates and a higher confidence is indicated (step 926 via decision step 922).

Where the pose discrimination process analyzes a stream of input images (step 930), a candidate traffic sign should exist in previous images with moderate changes to scale and position. Traffic sign candidates that are found in previous images and have expected change to scale and position would have their confidence increased (decision step 932 and step 934). Conversely, those candidates with large scale changes between successive images should have their confidence lowered or be eliminated (step 936 via decision step 932).

Where either set of the pose discriminator's steps (single image or stream) generates a sufficiently low confidence, the respective candidate is removed via decision step 342 and steps 318 and 322. If the confidence of a candidate remains sufficiently high, it is passed to the optional fascia discrimination process 350, which is described in further detail in FIG. 10. The fascia feature discrimination process 350 removes or alters the confidence of traffic sign candidates whose fascia features (sign markings) do not match those of a predetermined model. In the illustrative embodiment, the process 350 employs an input of the color image of the candidate features (step 1010). However, in alternate embodiments, grayscale intensity features can be employed. The process identifies fascia features within signs such as internal closed geometric shapes. To better exemplify fascia discrimination in operation, reference is made to the partial image frame 1400 shown in FIG. 14. This partial image frame 1400 includes a region of interest 1410 that includes an acquired sign 1412 that has already been initially classified by the geometric pattern-matching process (inverted triangle 1414) to be a form of warning sign. As shown, the sign 1412 includes an inverted triangular shape with a red border, 1416 and contrasting white center. These elements are all discernable by RSI geometric pattern matching, and their confidence is increased via color and/or pose discrimination. A matching technique (step 1014) can now be applied to measure the correlation of fascia features of the traffic sign candidate, in its current pose, to fascia features of predetermined fascia models to further increase confidence and potentially derive a subtype for the sign 1412. In this case, the centralized snowflake 1420 is the subject fascia that may vary in otherwise-similar inverted-triangle caution signs. By use of fascia discrimination, the snowflake 1420 (surrounded by an identifying circle 1422) can be matched to a model for such a feature within the given class/type (warning) of sign, so that the particular subtype of sign can be determined. Normalized correlation is one example of a matching technique. Another matching technique can validate edge polarity of internal geometric shapes. A third, alternate, matching technique can examine the projection of the traffic sign candidate along a particular axis and compare to pre-determined model projections. A candidate that does not match well (decision step 1016) would be eliminated or have its confidence lowered (step 1018), while a good match would result in a higher confidence (step 1020 via decision step 1016). Note that the fascia discrimination can be associated with the character or sign content recognition process (290 in FIG. 2), since the fascia discriminator analyzes certain interior details of the sign candidate that may contain specific characters or symbols that can be decoded. Such decoding can also (or alternatively) employ conventional OCR algorithms, or other appropriate symbol and character-recognition processes.

Where the fascia matching does not return a positive result or high confidence, then the procedure 300 may, or may not, discard the sign candidate. In an embodiment, if confidence is otherwise high that the sign type is correct, the procedure may simply indicate that the given sign is of a certain type/classification (i.e. warning) and not indicate the particular subtype of sign.

Those candidates that are not eliminated, and/or have sufficiently high confidence (decision step 352 of procedure 300), would then be classified as specific subtypes of traffic signs according to the model they match. The results for eliminated signs are passed to step 318 and the next candidate (if any) in the current image frame is analyzed by looping back to step 314. The results for successful candidates are passed to step 360. The results are then passed to the display and alert system (280 in FIG. 2), wherein appropriate use of the recognition information is made.

Figure 11:
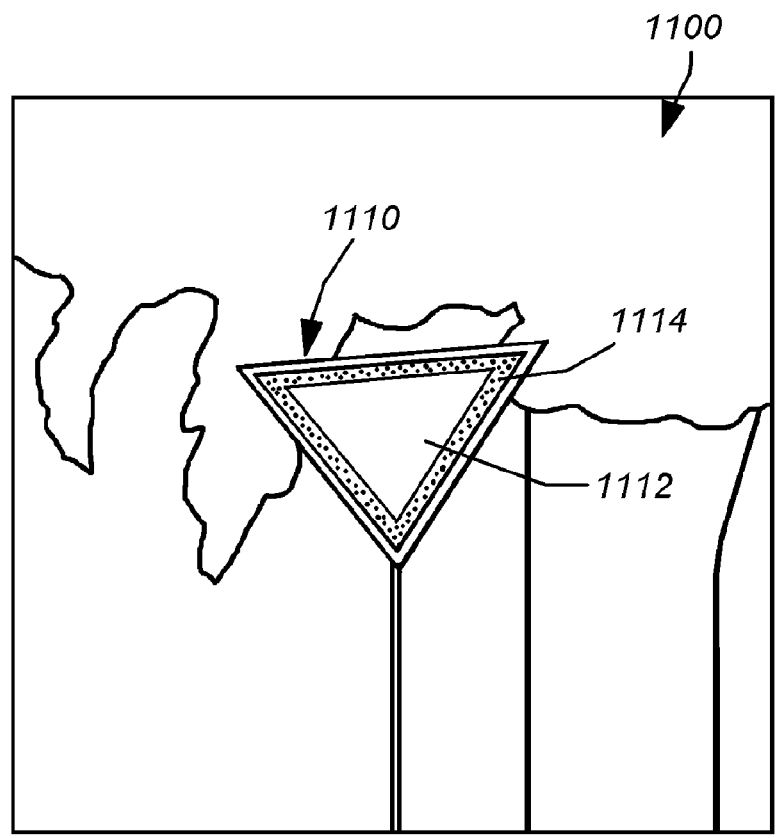
FIG. 11 is an exemplary image in which the candidate YIELD sign has been recognized as a possible candidate for the geometric pattern-matching process.
Figure 12:
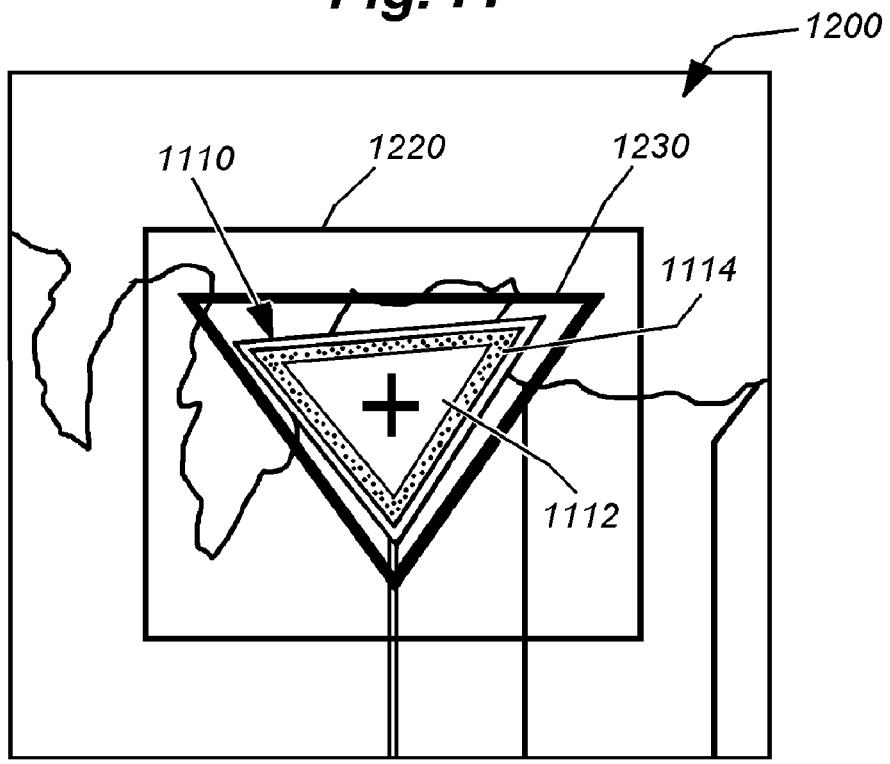
FIG. 12 is an exemplary image of the possible candidate sign of FIG. 12 in which the image is undergoing a geometric pattern-matching process.

By way of further example, FIGS. 11 and 12 show the pattern-matching process for an image 1100 with candidate sign 1110 a different shape and color combination according to the illustrative embodiment. In this example the candidate is the familiar inverted-triangular YIELD sign. It includes a white center 1112 and red border 1114 of a predetermined width with respect to the overall scale of the sign. These features make this sign relatively detectable by both color contrast and shape recognition. As shown, this sign 1110 exhibits significant rotation from the horizontal. In the image 1200 of FIG. 12, the RSI-based pattern-matching process has established a region of interest 1220 and matched the triangular shape (triangle 1230) of the exterior and interior triangular shapes (1114, 1112, respectively) from its trained set of sign candidates. Further discrimination steps will refine the confidence using such features as the pose, fascia and color combination/placement. Typically less preprocess enhancement of contrast is needed for a sign with the depicted red/white color combination.

Figure 13:
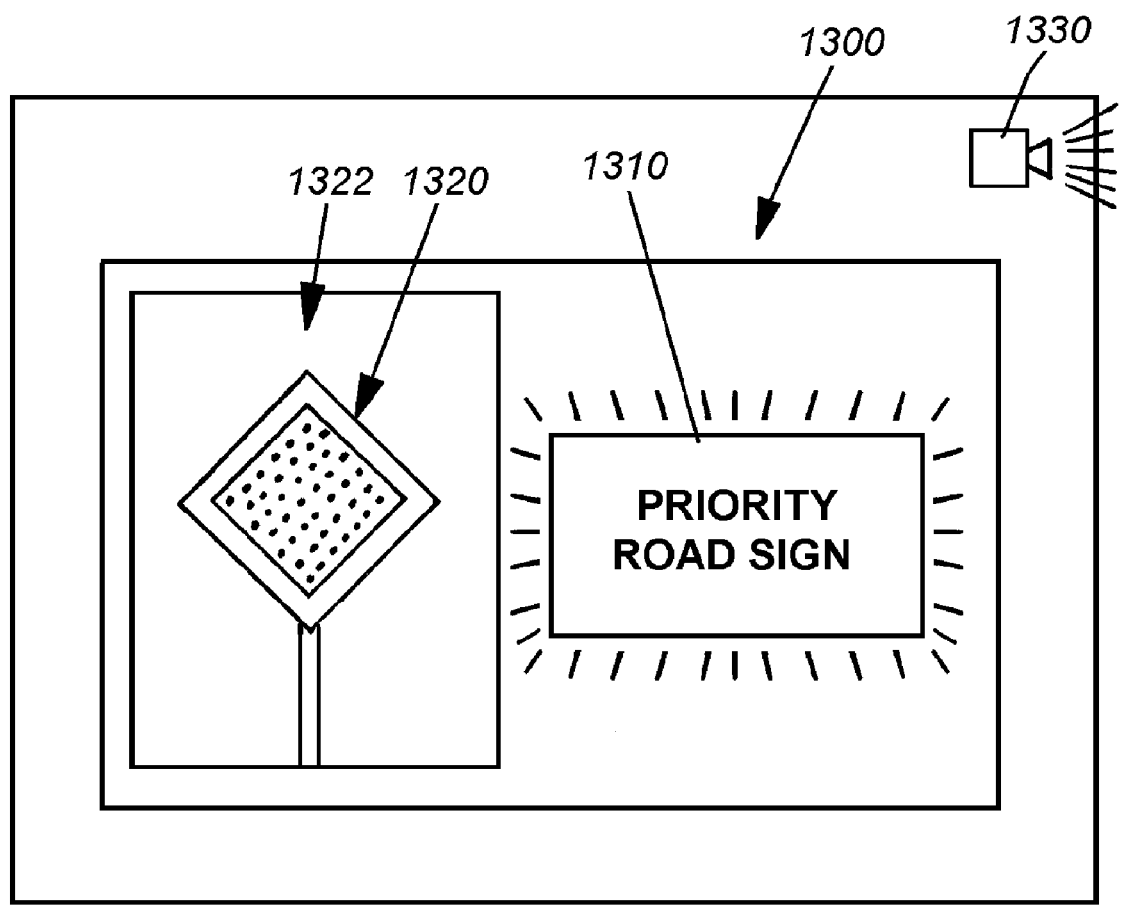
FIG. 13 is an exemplary vehicle-mounted display screen featuring audible, alphanumeric and image-based alerts of a recognized and classified traffic sign according to an embodiment of this invention.

Any acceptable system can be employed to alert the driver as to the type of recognized signs. The display screen 1300 shown in FIG. 13 responds to the data provided by the processor about the class and type of recognized sign and reports this information using an alphanumeric readout 1310. A captured image of the actual or a model version of the recognized 1320 sign is also displayed in the window 1322. An audible alert speaker 1330 is also provided. The speaker can provide a chime, buzzer or prerecorded voice. The voice can report the actual type of recognized sign. In other embodiments, further feedback mechanisms, such as a physical feedback mechanism that provides stimulus to the driver can also be provided using appropriate electronic and/or electromechanical devices. The drivers for these various alert mechanisms can be implemented using techniques known to those of ordinary skill.

As discussed above, where the procedure determines the sign classification or type with sufficient confidence, but fascia and/or other forms of discrimination/analysis cannot identify the particular type of sign, then the generic calls/type of sign can be reported without subtype information. For example, where fascia analysis successfully classifies the subtype of the sign 1412 as a "CAUTION-ICY ROAD" sign, this full type-subtype sign report may be reported by the display 1300 (and other above-described alerts). However, where the discrimination and recognition processes described above are unable to ascertain a given sub-type of sign, but are able to ascertain sign class/type with high confidence, the report may be truncated to state only "WARNING".

To resummarize, a vehicle-mounted traffic sign recognition system and method according to an illustrative embodiment consists of a forward-looking camera or cameras configured to capture stream data of imagery containing image frames having traffic sign images therein. An optional preprocess step then converts a received color image frame into an intensity grayscale image. Certain ranges (hues) in the color image are intensity-enhanced in the grayscale counterpart, as well as detected combinations of confusable colors, to improve the chances of accurate geometric pattern-matching. A rotation and scale-invariant (RSI) geometric pattern-matching process is constructed and arranged to identify traffic sign candidates in the stream data from either the preprocessed image frames, or alternatively, color image frames. The pattern-matching process includes a pre-training mechanism to pre-train with predetermined traffic sign models that include geometric features (e.g. sign shape and internal sign feature shapes). The pattern-matching process thereby classifies each of the sign candidates as either an unrecognized object or as a sign of a predetermined type upon a high-confidence match between the each of the sign candidates and at least one of predetermined traffic sign models. The process can include a range data pre-set mechanism to receive allowable ranges, scale, skew and rotation. The geometric pattern-matching process also includes a traffic sign candidate producer that determines, from the geometric pattern-matching process, traffic sign candidates. The pattern matching process can also produce pose information on the traffic sign candidates. The geometric pattern matching thereby initially determines the type or class of a sign candidate. One or more discrimination processes can each analyze, in succession, each of the traffic sign candidates received from the traffic sign candidate producer with respect to pre-trained traffic sign features to either increase or decrease a confidence level in each of the traffic sign candidates, and a confidence level determination process passes or fails the sign candidates based upon the increased or decreased confidence level. These discriminators may also operate to determine a given passed sign candidate's subclass, or type, based upon, for example fascia discrimination and/or character recognition processes. In an illustrative embodiment the plurality of discrimination processes includes one or more of (a) a color discrimination process that compares a color in a closed geometric shape of each of the traffic sign candidates to color features in an associated model from the pre-trained traffic sign features; (b) a pose discrimination process that compares a pose of each of the traffic sign candidates to pose features in an associated model from the pre-trained traffic sign features, and (c) a fascia discrimination process that compares predetermined fascia features of each of the traffic sign candidates in a current pose to fascia features in an associated model from the pre-trained traffic sign features.

As an additional feature, the system and method can employ a sign character and symbol recognition process that identifies characters and symbols contained within each of the candidate traffic signs and reports data associated with the identified characters and symbols. The results of recognition of sign candidates by the pattern-matching process and applicable discriminators are sent to at least one of (a) an alert system that reports the predetermined class of each of the passed traffic sign candidates to a vehicle driver, (b) a vehicle control system that employs data related to the predetermined class in controlling operation of the vehicle, or (c) any other system that can employ the recognized sign data by storing it for future use (e.g. a image and/or data recording system) and/or for use in a current operation.

It should be clear that the above-described invention provides an effective and accurate system for visually recognizing traffic signs in crowded environments. The system uses a robust RSI pattern-matching process to identify candidates, and has added robustness through the use of preprocessing and a variety of discriminators that use other color, pose and fascia-based features on the candidate signs to ensure accuracy while maintaining high processing speed. This is in part achieved be eliminating low-confidence candidates at each step of the process until only high-confidence candidates remain to be reported to the driver and otherwise used by the vehicle.

The foregoing has been a detailed description of illustrative embodiments of the invention. Various modifications and additions can be made without departing from the spirit and scope if this invention. Each of the various embodiments described above may be combined with other described embodiments in order to provide multiple features. Further-more, while the foregoing describes a number of separate embodiments of the system and method of the present invention, what has been described herein is merely illustrative of the application of the principles of the present invention. For example, while a single camera sensor is shown and described, it expressly contemplated that a plurality of cameras directed in appropriate orientations can be employed to read the same, overlapping or spaced-apart fields of view. The cameras can be served by one or more processors. In addition, it is expressly contemplated that the procedure herein can be employed to track sign locations from one scene to the next to improve accuracy or reduce false positives. Further, while the succession of discriminators shown each eliminate signs where the confidence level falls below a threshold, in an alternate embodiment, a candidate scoring a sufficiently high confidence level early in the process may allow for an immediate passing without proceeding through all discriminators. This may be desirable with highly distinctive signs, such as STOP and YIELD. In addition, the changes in scale versus time can be employed to report current distance from the sign to the vehicle. Also, it is expressly contemplated that any of the processes and procedures described herein can be implemented using electronic hardware, software that consists of a computer-readable medium of program instructions or a combination of hardware and software. Accordingly, this description is meant to be taken only by way of example, and not to otherwise limit the scope of this invention.

What is claimed is:

1. A vehicle-mounted traffic sign recognition system comprising:
    a forward-looking camera configured to capture stream data of imagery containing image frames having traffic sign images therein;
    a rotation and scale-invariant geometric pattern-matching process constructed and arranged to identify traffic sign candidates in the stream data, the geometric pattern-matching process including a pre-training mechanism to pre-train with predetermined traffic sign models having exterior geometric features and to classify each of the traffic sign candidates as either an unrecognized object or as a sign of a predetermined type upon a high-confidence match between each of the traffic sign candidates and at least one of predetermined traffic sign models, and wherein the geometric pattern-matching process also produces pose information concerning the traffic sign candidates including at least one of a position, scale, skew and rotation with respect to at least one of the predetermined traffic sig models matched; and
    with a plurality of discrimination processes, analyzing, in succession, each of the traffic sign candidates received from the traffic sign candidate producer with respect to pre-trained traffic sign features to either increase or decrease a confidence level in each of the traffic sign candidates, and passing or failing each of the traffic sign candidates based upon the confidence level, and associating passed traffic sign candidates with a predetermined type of traffic sign for use by the method, the plurality of discrimination processes including at least two of:
    a) a color discrimination process that compares a color in a closed geometric shape of each of the traffic sign candidates to color features in an associated model from the pre-trained traffic sign features,
    b) a pose discrimination process that compares a pose of each of the traffic sign candidates to pose features in an associated model from the pre-trained traffic sign features, and
    c) a fascia discrimination process that compares predetermined fascia features of each of the traffic sign candidates in a current pose to fascia features in an associated model from the pre-trained traffic sign features to determine a subtype of a sign candidate based upon an identified fascia matching the model from the pre-trained traffic sign features.

2. The system as set forth in claim 1 wherein the geometric pattern-matching process includes a pre-training mechanism to pre-train with predetermined traffic sign models having interior geometric features and to classify predetermined of the traffic sign candidates as either the unrecognized object or as the sign of the predetermined type upon a high-confidence match between the predetermined of the traffic sign candidates and at least one of predetermined traffic sign models having the interior geometric features.

3. The system as set forth in claim 1 further comprising one or more discrimination processes that each analyze each of the traffic sign candidates received from the geometric pattern-matching process to either increase or decrease a confidence level in each of the traffic sign candidates, and a confidence level determination process that passes or fails the sign candidates based upon the confidence level.

4. The system as set forth in claim 3 further comprising a preprocessor that receives the image frames as color imagery and that computes grayscale intensity from colors in the image frames and that enhances contrast between predetermined color ranges and hues, and generates corresponding enhanced grayscale intensity image frames for use by the geometric pattern-matching process.

5. The system as set forth in claim 3 wherein the one or more discrimination processes include a color discrimination process that compares a color in a closed geometric shape of each of the traffic sign candidates to color features in an associated model from the pre-trained traffic sign features.

6. The system as set forth in claim 3 wherein the one or more discrimination processes include a pose discrimination process that compares a pose of each of the traffic sign candidates to pose features in an associated model from the pre-trained traffic sign features.

7. The system as set forth in claim 3 wherein the one or more discrimination processes include a fascia discrimination process that compares predetermined fascia features of each of the traffic sign candidates in a current pose to fascia features in an associated model from the pre-trained traffic sign features and that is constructed and arranged to determine a subtype of a sign candidate based upon an identified fascia matching the model from the pre-trained traffic sign features.

8. The system as set forth in claim 3 wherein the classification mechanism is operatively connected to at least one of (a) an alert system that reports the predetermined class of each of the passed traffic sign candidates to a vehicle driver, (b) a vehicle control system that employs data related to the predetermined class in controlling operation of the vehicle; and (c) a recording system that stores predetermined data related to the sign candidates.

9. The system as set forth in claim 3 further comprising a traffic sign character and symbol recognition process that identifies characters and symbols contained within each of the candidate traffic signs and reports data associated with the identified characters and symbols.

10. The system as set forth in claim 1 further comprising a preprocessor that receives the image frames as color imagery and that computes grayscale intensity from colors in the image frames and that enhances contrast between predetermined color ranges and hues, and generates corresponding enhanced grayscale intensity image frames for use by the geometric pattern-matching process.

11. The system as set forth in claim 10 wherein the contrast is enhanced based upon predetermined intensity data associated with a confusable combination of the colors in the image frames and based upon predetermined color hues present in the image frames.

12. A method for recognizing traffic signs from a vehicle comprising the steps of:
- capturing stream data of imagery containing image frames having traffic sign images therein;
- identifying, with a rotation and scale-invariant geometric pattern-matching process, traffic sign candidates in the stream data, the geometric pattern-matching process including a pre-training mechanism to pre-train with predetermined traffic sign models having exterior geometric features and classifying each of the traffic sign candidates as either an unrecognized object or as a sign of a predetermined type upon a high-confidence match between the each of the traffic sign candidates and at least one of predetermined traffic sign models, and wherein the geometric pattern-matching process also produces pose information concerning the traffic sign candidates including at least one of a position, scale, skew and rotation with respect to at least one of the predetermined traffic sign models matched; and
- with a plurality of discrimination processes, analyzing, in succession, each of the traffic sign candidates received from the traffic sign candidate producer with respect to pre-trained traffic sign features to either increase or decrease a confidence level in each of the traffic sign candidates, and passing or failing each of the traffic sign candidates based upon the confidence level, and associating passed traffic sign candidates with a predetermined type of traffic sign for use by the method, the plurality of discrimination processes including at least two of:
  a) a color discrimination process that compares a color in a closed geometric shape of each of the traffic sign candidates to color features in an associated model from the pre-trained traffic sign features,
  b) a pose discrimination process that compares a pose of each of the traffic sign candidates to pose features in an associated model from the pre-trained traffic sign features, and
  c) a fascia discrimination process that compares predetermined fascia features of each of the traffic sign candidates in a current pose to fascia features in an associated model from the pre-trained traffic sign features to determine a subtype of a sign candidate based upon an identified fascia matching the model from the pre-trained traffic sign features.

13. The method as set forth in claim 12 wherein the geometric pattern-matching process includes a pre-training mechanism to pre-train with predetermined traffic sign models having interior geometric features and to classify predetermined of the traffic sign candidates as either the unrecognized object or as the sign of the predetermined type upon a high-confidence match between the predetermined of the traffic sign candidates and at least one of predetermined traffic sign models having the interior geometric features.

14. The method as set forth in claim 13 further comprising, with one or more discrimination processes, analyzing each of the traffic sign candidates received from the geometric pattern-matching process with respect to pre-trained traffic sign features to either increase or decrease a confidence level in each of the traffic sign candidates, and passing or failing each of the traffic sign candidates based upon the confidence level, and associating passed traffic sign candidates with a predetermined type of traffic sign for use by the system.

15. The method as set forth in claim 14 further comprising preprocessing the image frames received as color imagery including computing grayscale intensity from colors in the image frames and enhancing contrast between predetermined color ranges and hues, and generating corresponding enhanced grayscale intensity image frames for use by the geometric pattern-matching process.

16. The method as set forth in claim 14 wherein the one or more discrimination processes include a color discrimination process that compares a color in a closed geometric shape of each of the traffic sign candidates to color features in an associated model from the pre-trained traffic sign features.

17. The method as set forth in claim 14 wherein the one or more discrimination processes include a pose discrimination process that compares a pose of each of the traffic sign candidates to pose features in an associated model from the pre-trained traffic sign features.

18. The method as set forth in claim 14 wherein the one or more discrimination processes include a fascia discrimination process that compares predetermined fascia features of each of the traffic sign candidates in a current pose to fascia features in an associated model from the pre-trained traffic sign features to determine a subtype of a sign candidate based upon an identified fascia matching the model from the pre-trained traffic sign features.

19. The method as set forth in claim 14 further comprising at least one of (a) reporting the predetermined class of each of the passed traffic sign candidates to a vehicle driver, and (b) employing data related to the predetermined class in controlling operation of the vehicle and (c) storing predetermined data related to the sign candidates.

20. The method as set forth in claim 14 further comprising identifying, with a traffic sign character and symbol recognition process, characters and symbols contained within each of the candidate traffic signs and reports data associated with the identified characters and symbols.

21. The method as set forth in claim 12 further comprising preprocessing the image frames received as color imagery including computing grayscale intensity from colors in the image frames and enhancing contrast between predetermined color ranges and hues, and generating corresponding enhanced grayscale intensity image frames for use by the geometric pattern-matching process.

22. The method as set forth in claim 21 wherein the step of enhancing is based upon predetermined intensity data associated with a confusable combination of the colors in the image frames and based upon predetermined color hues present in the image frames.

* * * * *